United States Patent [19]
Rhodes

[11] 3,896,720
[45] July 29, 1975

[54] SEEDCOTTON COMPACTER
[76] Inventor: Charles Don Rhodes, Rt. 2, Petersburg, Tex. 79250
[22] Filed: Nov. 8, 1973
[21] Appl. No.: 413,926

[52] U.S. Cl.............. 100/226; 100/100; 100/229 R; 100/257; 100/269 R; 214/9
[51] Int. Cl...................... B30b 1/32; B30b 15/06
[58] Field of Search........ 214/9; 100/100, 226, 255, 100/257, 269 R, 215, 229 R; 130/20

[56] References Cited
UNITED STATES PATENTS

| | | | |
|---|---|---|---|
| 789,906 | 5/1905 | Gordon............................ | 100/257 X |
| 810,485 | 1/1906 | Gunn et al............................ | 214/9 |
| 3,703,966 | 11/1972 | Jones et al............................ | 100/100 |
| 3,749,003 | 7/1973 | Wilkes et al..................... | 100/100 X |

Primary Examiner—Billy J. Wilhite
Attorney, Agent, or Firm—Wendell Coffee

[57] ABSTRACT

A skeleton frame has side wall panels on the inside thereof forming a chute-like structure. With the interior side wall panels out, a trailer may be driven through the chute-like structure and seedcotton dumped into the trailer and tramped in the trailer with a packer. The packer is mounted on a carriage carried by two trolleys running along rails on top of the side walls.

The side walls may be moved inward to form a ricker; the cotton tramped into ricks by the packer. The foot of the packer may be lowered to form the cotton into ricks in this mode of operation.

12 Claims, 9 Drawing Figures 3,896,720

SEEDCOTTON COMPACTER

BACKGROUND OF THE INVENTION

1. Field of the Invention

This invention relates to cotton harvesting, handling, and pressing; and more particularly to a structure for forming harvested seedcotton into ricks or tramping the harvested seedcotton into trailers.

2. Description of the Prior Art

At one time, cotton was harvested by hand and carried to the gin in horse-drawn wagons where it was ginned at the time it was delivered to the gin. Subsequently, mechanical harvesters were developed. The cotton was harvested and then delivered by a conveyor to a trailer drawn behind the harvester. When the trailer became filled, often being tramped by human labor, then the trailer was disconnected from the harvester and connected to a truck which towed the trailer to the gin where the seedcotton might wait for 2 or 3 days before being ginned.

A further development is that many of the cotton harvesting machines carry an overhead basket. The cotton is conveyed thereto and then the overhead basket dumped into a trailer at the turnrow of the field. Still, the cotton is often tramped in the trailer by human labor. When the trailer is filled to capacity, it is towed by a pickup truck to the gin where it waits to be ginned.

Mechanical trampers have been proposed. I.e., a portable tramper could be used to tramp the cotton into the trailer rather than doing it by human labor.

A more recent development is that the cotton could be formed into ricks at the turnrow of the field and stored there until picked up from the rick into a trailer and transported to the cotton gin. Jones and Smith, U.S. Pat. No. 3,703,966 shows this development.

SUMMARY OF THE INVENTION

1. New and Different Function

I have devised a machine which offers the farmer greater flexibility. Under one mode of operation, my machine can be used as an aid in dumping cotton into a trailer and tramping the cotton into the trailer. In another mode of operation, my device can be used for the forming of the cotton into ricks.

Basically, my device has a tramper mounted over the chute (or "slip form" as it is called in the Jones and Smith patent). The tramper is mounted upon trolleys so the tramper can be moved to the spot to be tramped; also, the tramper can be manipulated to distribute the cotton lengthwise of the chute.

2. Objects of this Invention

An object of this invention is to tramp seedcotton.

Another object is to form cotton into ricks or tramp it in trailers.

Other objects are to achieve the above with a device that is sturdy, durable, simple, safe, efficient, versatile, and reliable, yet inexpensive and easy to manufacture, adjust, operate, and maintain.

Further objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not to the same scale.

DESCRIPTION OF THE PREFERRED EMBODIMENT

Figure 1:
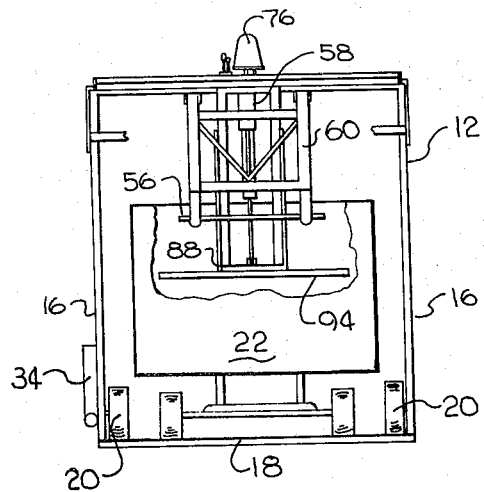
FIG. 1 is an end elevational view, with parts broken away, of an embodiment of my invention.

Referring more particularly to FIGS. 1, 2, 3, and 4, there may be seen the general device having an outside frame or skeleton 10. The skeleton 10 includes four vertical corner posts 12 which form the main support of the device. There are various cross-bracing members 14, thus forming two side frames 16. The side frames are vertical and parallel to one another and they have a large opening between them, forming the chute-like structure or slip form.

Bottom spacer bars 18 extend from one side frame 16 to the other at the front and back. The back bottom spacer bar 18 is removable. When the wheels 20 are in the raised position (FIG. 1), the spacer bars 18 are upon the ground and, therefore, it is possible to pull trailer 22 into the chute as defined by the two side walls 16. The two side walls 16 are also connected by back top spacer bar 24. At the top front, the two side frames 16 are connected by walkway 26 which also reinforces and strengthens the structure.

Rails 28 extend longitudinally along the top of the side frames 16. Rear or first trolley 30 and front or second trolley 32 are mounted to run along the rails 28 as will be more fully described hereinafter.

Figure 4:
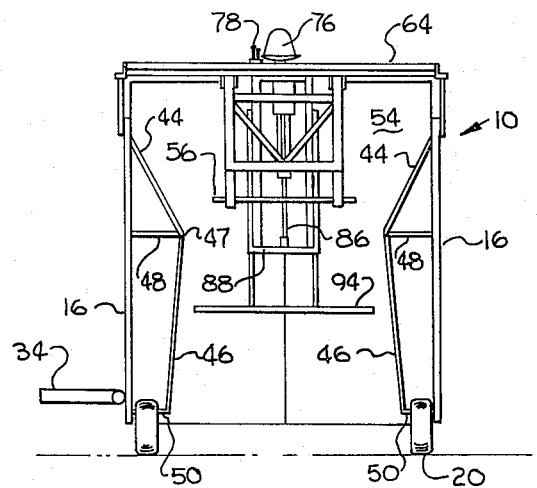
FIG. 4 is an end view thereof in the transport position with the tramper extended to make ricks and the sidewall panels inward to make ricks.

Hitch 34 is attached to the lower front side of the skeleton 10. The hitch 34 is attached to one of the side frames 16 and is so arranged and constructed that it folds up against the side when not in use. (FIG. 4).

Figure 2:
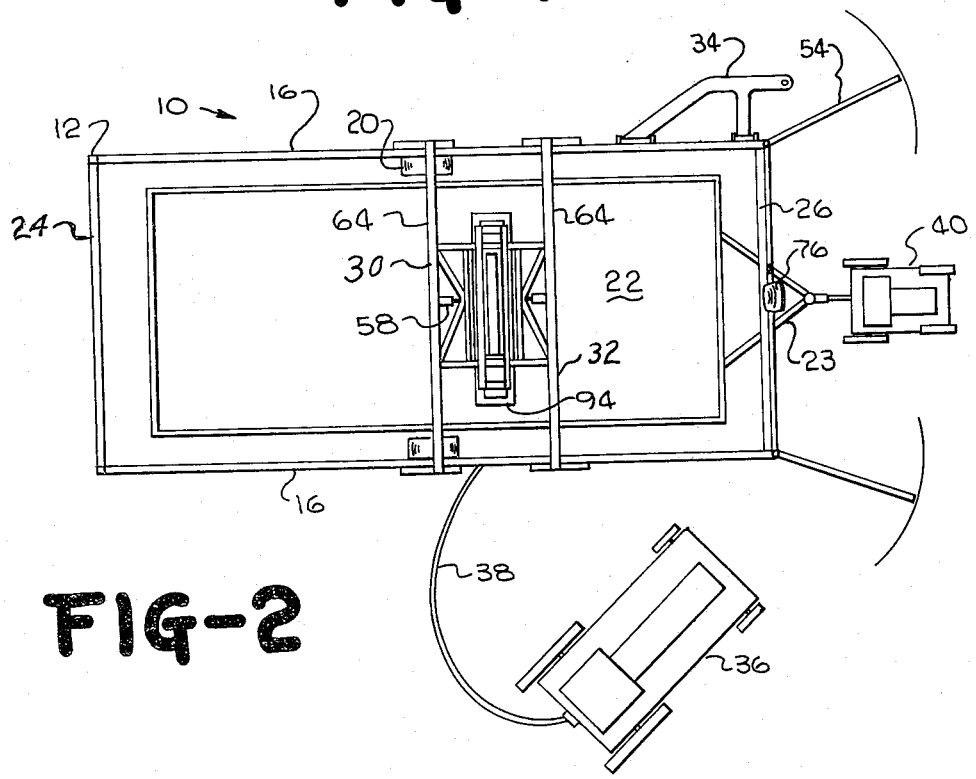
FIG. 2 is a top plan view thereof used to pack cotton in a trailer.
Figure 3:
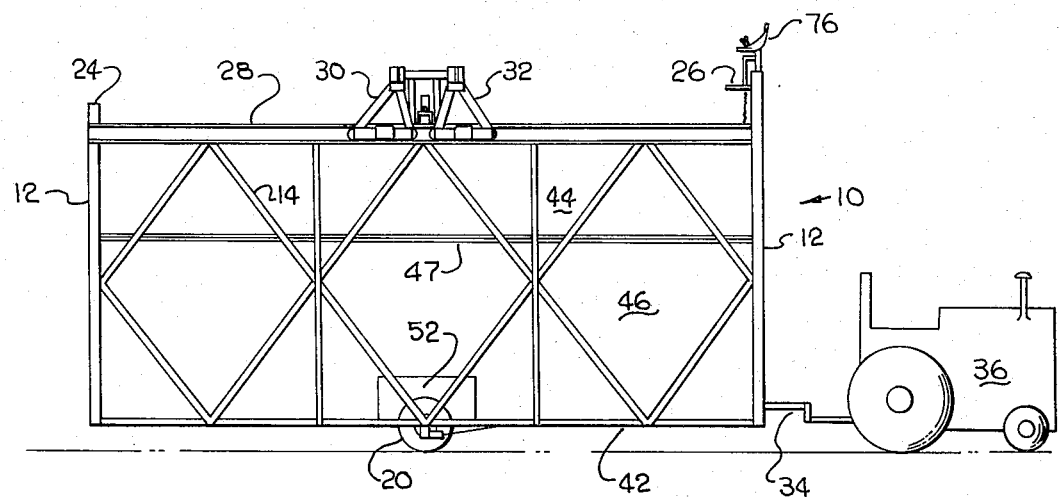
FIG. 3 is a side elevational view thereof in the transport position.

Towing tractor 36 may be attached to the hitch 34 as seen in FIG. 3. With the wheels in the lower position, the skeleton 10 can be moved from one location to another. When in location, the wheels 20 are raised, the hitch 34 folded up, and the towing tractor 36 disconnected and moved to one side to furnish power to the mechanism through hydraulic hose 38 as illustrated in FIGS. 1 and 2. The mechanism is being used in FIGS. 1 and 2 to tramp cotton in the trailer 22 which is towed by a towing vehicle shown as tractor 40 attached to trailer tongue 23.

Those skilled in the art will recognize that many details of construction have been omitted. E.g., it has been stated that the wheels 20 can be raised and lowered, but the mechanism to perform this has not been shown inasmuch as it would be obvious to one with ordinary skill in the art and, in any event, the Jones and Smith patent adequately shows this detail. Also, it will be apparent that lower longitudinal members 42 of the side frames 16 act as skids for short moves.

Top side panel 44 is pivoted to the top or near the top of each of the side frames 16. They are hinged so that the hinge extends longitudinally of the side frames, i.e., the hinges or pivots are parallel to the rails 28. Main panel 46 of each side is connected by hinge 47 at the top of the main panels 46 and the bottom of the top side panels 44 (FIGS. 3 and 4). Therefore, the hinge 47 is parallel to the previously described hinge and also parallel to the rails 28. Spacer means in the form of upper strut 48 extend from the side frames 16 to the main panels 46 at the hinges 47. Lower struts 50, also spacer means, are at the bottom of the main panel 46. The lower struts 50 are shorter than the upper struts 48 so the main panels 46 slope outward at the bottom. This provides "draft" so the slip form may be moved upward from the formed rick without destroying the rick. Those skilled in the art will know how to make the struts foldable to move them out of the way when the side panels are collapsed against the side frames 16 as seen in FIGS. 1 and 2.

The side panels 46 have openings 52 in the lower portion thereof to clear the wheels 20 when they are in the collapsed or wide position. The fillers or wheel panels for these openings 52 have not been illustrated nor the exact details of the manner in which they would be fixed shown. Those with ordinary skill in either the farming or the metal working arts would be able to devise obvious mechanisms for this purpose.

Referring more particularly to FIG. 1, there may be seen that the side panels and more particularly the upper top side panels 44 of sheet material extend above the top of the trailer so as to protect the area from blowing wind when seedcotton is being dumped into the trailer 22 positioned within the chute-like structure. Likewise, it will be understood that when the structure is arranged for making a rick, as shown in FIGS. 3 and 4, the top panels act as funnels to guide the seed cotton into the rick forming area which is between the main panels 46 of sheet material. Often the rick will be formed on the ground or on plastic sheets spread upon the ground. However, it will be understood by those with skill in the art that pallets could be put on the ground and when the cotton is moved to the gin, the cotton can be elevated by fork lifts and the pallets.

Referring again to FIG. 2, there may be seen doors 54 pivoted to the front of the side frame 16 along the front corner post 12. The doors are open when the mechanism is used to compact seedcotton within the trailer 22, but are closed as seen in FIG. 4 to form the front of the rick when the mechanism is being used to compact cotton into a rick. It will be understood that it is merely a matter of design and choice as to whether one wide door is used or a door hinged to each side and, also, as to whether half doors are used so the bottom half or the top half can be independently opened and closed.

Figure 5:
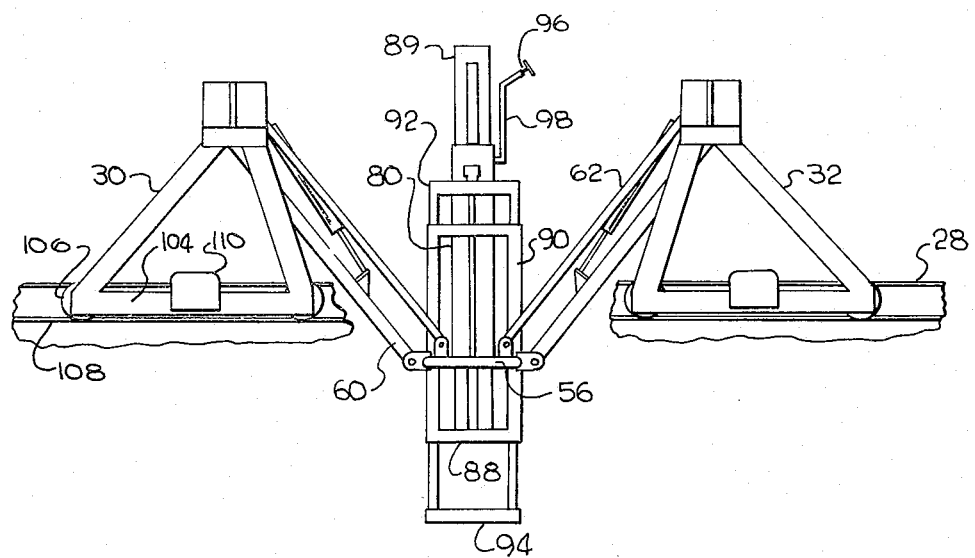
FIG. 5 is a side elevational view of the packer mechanism with parts broken away for clarity.
Figure 6:
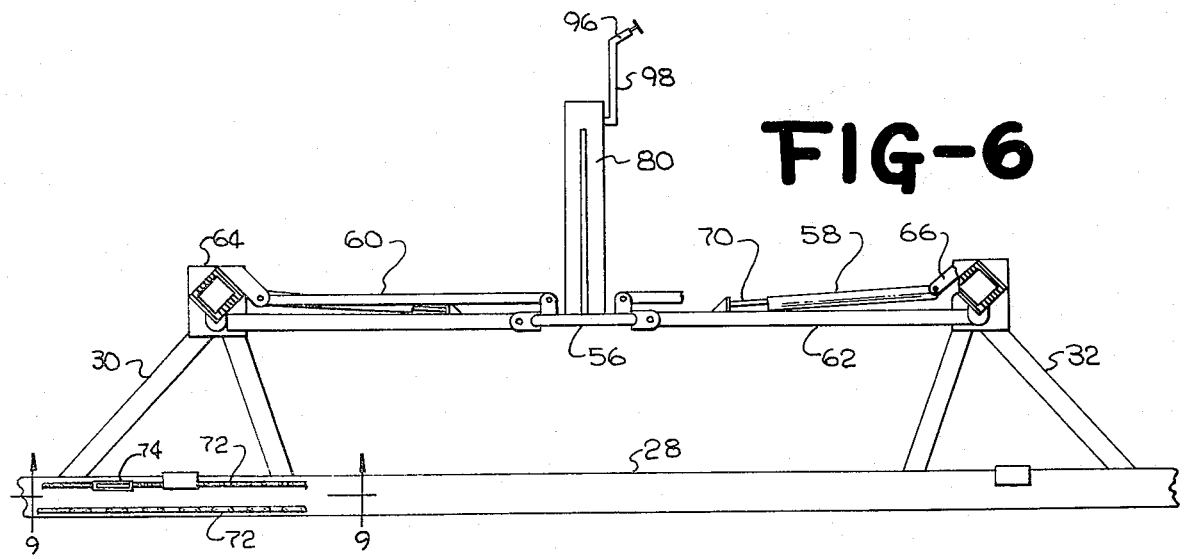
FIG. 6 is a side sectional view of the subassembly of the packer mechanism in a different position.
Figure 7:
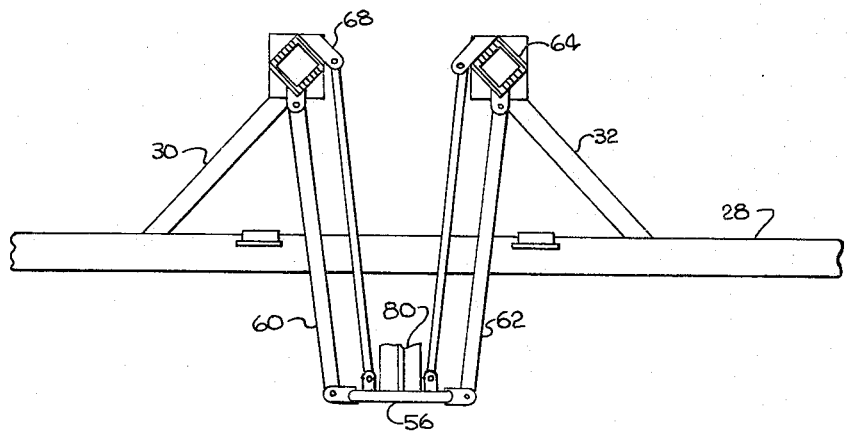
FIG. 7 is a side sectional view of a subassembly of the packer with parts broken away for clarity.

Referring to FIGS. 5, 6, and 7, there may be seen the two trolleys 30 and 32. Carriage 56 is mounted between the two trolleys by parallel linkage mechanisms. The parallel mechanisms include two parallel bars 60 extending from the first trolley 30 to the carriage 56 and the parallel linkage bars 62 extending from the second trolley 32 to the carriage 56. Hydraulic cylinder 58 is attached to each of the crossbars 64 of the trolleys 30 and 32. The attachment of the cylinder 58 is to ears 66 which are approximately in line with ears 68 by which the upper of the parallel linkage bars are attached to the trolley. Piston rod 70 of the cylinder 58 is attached to the lower of the arms of the parallel linkage mechanism. Therefore, analysis of the mechanism will indicate that for a relatively short stroke of the piston rod 70 within the cylinder 58 a rather large movement of the carriage 56 is obtained. Also, analysis will show that greater force may be applied by the carriage 56 when it is in a lower position as seen in FIGS. 5 or 7 than when it is in the completely raised position as seen in FIG. 6.

However, analysis will also show that when the tramper is tramping, more likely the carriage 56 will be in the lower position, either as shown fully lower in FIG. 7 or at least in a partially lowered position as seen in FIG. 5. Therefore, with the arrangement I have provided, it is possible to use a cylinder having a very short stroke to obtain large vertical movement of the carriage 56 and when the carriage 56 is at a lower position, more power can be transferred to it by the cylinder 58 and piston 70. Also, it will be seen that as the carriage 56 is lowered to a lower position, the trolley 30 and the trolley 32 must move together. This is well shown as between FIGS. 5, 6, and 7. Therefore, it is necessary that at least one of the two trolleys be freewheeling, i.e., free to move along the rails 28.

Figure 9:
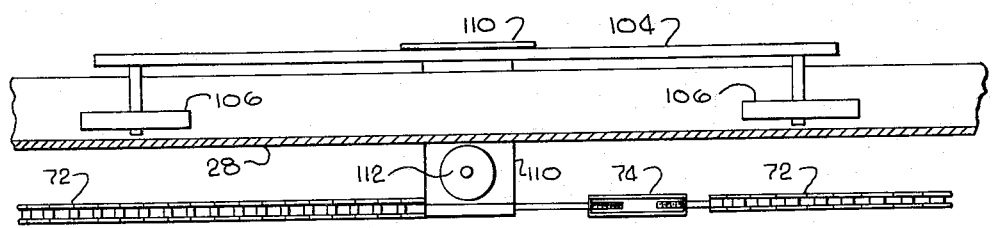
FIG. 9 is a sectional detail taken substantially on line 9—9 of FIG. 6 showing construction of the trolley and track.

I have chosen to attach the first or rear trolley 30 to chain 72 and permit the forward or second trolley 32 to be freewheeling. The chain 72 extends along the rails 28 of the walls or the side frames 16. The attachment of the trolley to chain 72 is shown in FIG. 9 and the attachment utilizes turnbuckles 74 so the chain may be maintained taut. The chain 72 is reciprocated by being trained over sprockets at each end of the rail 28, the sprockets being operated by hydraulic motor; the details of this have not been shown inasmuch as those with ordinary skill can build chain drives to traverse trolleys along a track. However, it will be understood that when the operator is seated in seat 76 above the walkway 26, he can readily operate hydraulic control levers 78 (FIG. 4), one of which causes the trolley 30 to move back and forth along the track 28. The trolley 32 will likewise move because the relationship of the trolley 32 to the trolley 30 is fixed by the positioning of the parallel linkage arms 60 and 62 which are fixed by the extend of the hydraulic cylinder 58.

Guide posts 80 are attached to the carriage 56 and extend vertically above it (FIGS. 5, 6, 7, and 8). Cylinder 82 is attached to yoke 84 connecting the guide posts 80. Piston 86 of the cylinder 82 is attached to tramper 88. The tramper 88 is held in a guided position to the guide posts 80 by tramper legs 89 which are telescoped within the guide posts 80. Guide tubes 90 on the tramper 88 receive legs 92 of foot 94.

The hydraulic cylinder 82 and the two hydraulic cylinders 58 are controlled by the operator from a single lever at his control station 78. The hydraulic fluid, as operated by the operator, is directed to dividing valve 96 which is mounted upon arm 98 attached to the guide posts 80. Although not shown in that position, it will be understood from an examination of FIGS. 2 and 3 that if the trolleys 30 and 32 are moved near the seat 76, the operator from his seat 76 can adjust and change the valve 96. By adjusting and changing the valve 96, the operator may cause larger fluid passage flows to be connected to the cylinders 58 or the cylinder 82, changing somewhat the mode of operation.

Figure 8:
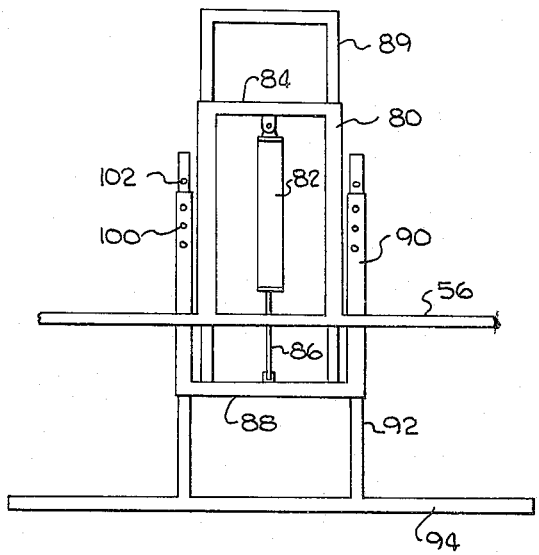
FIG. 8 is an end view of another subassembly of the packer.

The position of the packer foot 94 in relationship to the tramper 88 may be adjusted by the positioning of pins in holes 100 and 102. As seen in FIG. 8, the holes 100 are located through the guide tubes 90 and the holes 102 are located through the legs 92. Therefore, it may be seen that when the packer is being used to compact cotton within a trailer, as seen in FIG. 1, the foot 94 would be moved upward to a position contacting the tramper 88 and, therefore, the tramper foot in the full lower position will still be spaced a proper distance above the floor of the trailer 22.

However, when the compacter is used to compress cotton into a rick, the foot 94 can be adjusted lower from the tramper 88 to be properly positioned from the ground or pallets to properly form the cotton into the rick. Of course, this adjustment which is made by placing pins through the holes 100 and 102 is not an operation which is normally performed during the process of compacting the cotton, but only as certain changes are necessary to change the operation from the forming of a rick, as seen in FIG. 4, or pressing the cotton within a trailer, as seen in FIG. 1. This change also necessitates the extension of the struts 48 and 50 to change the position of the main side panels 46.

However, during operation, the operator must first opperate the lever to lower the foot 94 and then operate the lever to cause the trolleys 30 and 32 to transverse and, therefore, in such a manner, he can rake the cotton forward or back within the chute-like structure. This operation, of course, is the same whether or not a trailer is located within the chute.

Although the details of the trolleys have not been shown, it will be understood that each have lower frame member 104 (FIGS. 5 and 9). Support wheels 106 are mounted upon axles to run upon flanges 108 of the rails 28. Carrier 110 extends across the rail 28 to carry positioning horizontal wheel 112 which holds the trolley in position. It is to this carrier 110 that the chain 72 is attached, as illustrated in FIG. 9.

It will be understood that the parallel bars 60 and 62, carriage 56, cylinders 82 and 58, with the foot 94 and all the other mechanism interconnecting these elements, form packer means which are at least partially mounted on the first trolley for packing the cotton.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. A seedcotton compacter comprising:
 a. a skeleton including
  i. two rectangular parallel side frames,
  ii. connected together at top and bottom, and
  iii. open at top, bottom, back, and front,
 b. a top side panel for each side frame
  i. each of said top side panels being formed of sheet material with
  ii. the top edge of the top panel pivoted to the side frame near the top edge thereof,
 c. a main panel for each side,
  i. each of said main panels being formed of sheet material with
  ii. the top edge of each main panel pivoted to the top panel at the bottom edge of the top panel,
 d. spacer means on each side frame for spacing the main panels inside and inward of the side frames, and
 e. packer means mounted on the top of the side frames for packing seedcotton between the side frames,
 f. so arranged and constructed
  i. that with the main panels depending downward from the top edge of side frames, then a trailer may be positioned within the side frames and seedcotton dumped therein and packed in the trailer by the packer means, and
  ii. that with the main panels spaced inward of said side frames, then seedcotton may be dumped therein and formed into a rick by packing between the main panels by said packer means.
2. The invention as defined in claim 1 with an additional limitation of
 g. at least one door pivoted to the front edge of at least one of said rectangular side frames so that the open front of said skeleton may be closed.
3. The invention as defined in claim 2 with additional limitations of
 h. a rail upon the top of each of said frames,
 j. at least one trolley mounted upon said rails and extending across the open top of said skeleton, and
 k. said packer means mounted upon said trolley.
4. The invention as defined in claim 3 wherein
 m. said packer means includes,
  i. a tramper,
  ii. a foot attached to the tramper,
  iii. extension means on said foot for extending and retracting vertically the foot an adjustable distance from said tramper so that the foot may be raised for packing seedcotton in a trailer and may be lowered for packing seed-cotton in a rick.
5. In a seedcotton compacter having
 a. a chute-like structure including
 b. two parallel vertical side walls, and
 c. an open top and bottom;
 d. the improvement comprising:
 dd. said chute-like structure
  i. being open at the back,
  ii. having doors at the front which may be open so a trailer may be pulled through the structure, and
  iii. a trailer between the two side walls,
 e. a rail upon the top of each of the side walls,
 f. at least a first trolley mounted on the rails and extending across the chute-like structure,
 g. packer means on the trolley for packing the cotton in the structure,
 h. said packer means includes
  i. a tramper,
  ii. a foot attached to the tramper,
  iii. extension means on said foot for extending and retracting vertically the foot an adjustable distance from said tramper so that the foot may be raised for packing seedcotton in the trailer or lowered for packing seedcotton in a rick.

6. The invention as defined in claim 5 with additional limitations of
j. a chain extending along the rail of each wall,
k. means interconnecting the chain, wall and trolley so the trolley may be moved along the rails by said chain.

7. The invention as defined in claim 5 with additional limitations of
h. a second trolley mounted on the rails and extending across the chute-like structure,
j. said packer means supported by the first and second trolleys.

8. The invention as defined in claim 7 with additional limitations of
k. a chain extending along each of said rails on top of the walls,
m. means interconnecting the rail, chain, and first trolley so that the first trolley may be moved along the rails.

9. In a seedcotton compacter having
a. a chute-like structure including
b. two parallel vertical side walls, and
c. an open top;
d. the improvement comprising:
e. a rail upon the top of each of the walls,
f. at least a first trolley mounted on the rails and extending across the chute-like structure,
g. packer means on the trolley for packing the cotton in the structure,
h. a second trolley mounted on the rails and extending across the chute-like structure,
j. said packer means supported by the first and second trolleys, and
k. a carriage,
m. bars extending from said carriage to said first trolley,
n. additional bars extending between said carriage and said second trolley,
o. hydraulic cylinders interconnecting said trolleys and bars, whereby
p. the carriage may be raised and lowered by said hydraulic cylinders,
q. said raising and lowering motion of the carriage causing the trolleys to move toward and away from each other.

10. The invention as defined in claim 9 wherein said packer means includes
r. a tramper mounted on said carriage for vertical movement.

11. The invention as defined in claim 9 with additional limitations of
r. a chain extending along each of said rails on top of the walls,
s. means interconnecting the rail, chain, and first trolley so that the first trolley may be moved along the rails.

12. The invention as defined in claim 11 wherein said packer means includes
t. a tramper mounted on said carriage for vertical movement.

* * * * *